US009275401B2

(12) United States Patent
Ghaskadvi et al.

(10) Patent No.: US 9,275,401 B2
(45) Date of Patent: Mar. 1, 2016

(54) TAMPER RESISTANT VIDEO RENDERING

(75) Inventors: Vijay S. Ghaskadvi, San Jose, CA (US); Sunil Agrawal, Milpitas, CA (US)

(73) Assignee: Adobe Systems Incorporated, San Jose, CA (US)

(*) Notice: Subject to any disclaimer, the term of this patent is extended or adjusted under 35 U.S.C. 154(b) by 2588 days.

(21) Appl. No.: 11/851,045

(22) Filed: Sep. 6, 2007

(65) Prior Publication Data

US 2014/0259166 A1 Sep. 11, 2014

(51) Int. Cl.
*G06F 3/00* (2006.01)
*G06Q 30/02* (2012.01)

(52) U.S. Cl.
CPC ........ *G06Q 30/0273* (2013.01); *G06Q 30/0277* (2013.01)

(58) Field of Classification Search
USPC ............................................. 713/94, 189, 194
See application file for complete search history.

(56) References Cited

U.S. PATENT DOCUMENTS

| | | | | | |
|---|---|---|---|---|---|
| 5,875,249 | A * | 2/1999 | Mintzer | ................ | G06T 1/0021 283/113 |
| 6,683,649 | B1 * | 1/2004 | Anderson | .......... | H04N 1/00161 348/231.4 |
| 7,055,166 | B1 * | 5/2006 | Logan | .................... | H04H 20/14 715/719 |
| 7,320,069 | B1 * | 1/2008 | Sundharraj | .............. | G06F 21/10 348/E7.056 |
| 2002/0112163 | A1 * | 8/2002 | Ireton | .................... | H04L 9/3236 713/176 |
| 2003/0088783 | A1 * | 5/2003 | DiPierro | ............. | G06F 21/6245 713/189 |
| 2005/0004993 | A1 * | 1/2005 | Miller | ............... | G06F 17/30607 709/207 |
| 2005/0091107 | A1 * | 4/2005 | Blum | ................ | G06F 17/30029 705/14.65 |
| 2005/0271274 | A1 * | 12/2005 | Urano | .................... | G06T 7/0083 382/173 |
| 2006/0129907 | A1 * | 6/2006 | Volk et al. | ...................... | 715/500 |
| 2007/0063884 | A1 * | 3/2007 | Iwamura | ............... | G06T 1/0021 341/156 |
| 2007/0101074 | A1 * | 5/2007 | Patterson | .......... | G06F 17/30153 711/156 |
| 2007/0277039 | A1 * | 11/2007 | Zhao | ..................... | G06T 1/0085 713/176 |
| 2007/0299828 | A1 * | 12/2007 | Lewis | ............... | G06F 17/30569 |
| 2008/0168564 | A1 * | 7/2008 | Lerouge | .................. | G06F 21/64 726/26 |
| 2008/0273861 | A1 * | 11/2008 | Yang | ..................... | G06T 1/0028 386/259 |
| 2008/0294696 | A1 * | 11/2008 | Frandzel | ............... | G06F 3/0608 |
| 2009/0083781 | A1 * | 3/2009 | Yang | ................. | G06F 17/30781 725/20 |
| 2009/0141805 | A1 * | 6/2009 | Lu | ..................... | G06F 17/30781 375/240.24 |

* cited by examiner

*Primary Examiner* — Joseph P Hirl
*Assistant Examiner* — Sayed Beheshti Shirazi
(74) *Attorney, Agent, or Firm* — Kilpatrick Townsend & Stockton LLP (57) ABSTRACT

Video media subscribers attempt to circumvent embedded ads in downloads by modifying the media files to render only the content feature. A media program is defined as an integrated set of media files including the requested content feature and the accompanying promotional materials. Media files associated with a particular content feature are stored as an integrated whole, and security tokens computed on selected random portions of the collection of media files that define the media program (content feature and interspersed ads). A hash engine computes a security token on selected blocks of the media files. The security tokens and corresponding metadata are stored in a secure repository. Before rendering the content feature, the hash values are recomputed on the downloaded media program; and compared to the corresponding locations from the stored hash values and metadata.

19 Claims, 8 Drawing Sheets

TAMPER RESISTANT VIDEO RENDERING

BACKGROUND

The modern trend of widespread access to digital video, along with increased availability of low cost computing devices for rendering video and audio media content, has fueled a an increase in multimedia (i.e. audio/video) programming available for remote transmission (i.e. downloading) over public access networks such as the Internet. Personal audio devices, such as MP3 players and the well-known Ipod® personal audio device, allow users to download digital music selections on a fee for services basis. More recently, video programming has become feasible to provide to individual users on a demand basis, allowing users, or subscribers, to select, download and view video on a PC, laptop, and even video enabled cell phones, PDAs, and other suitable personal communication devices.

In video program delivery, advertising media often forms a substantial aspect of revenue generation in the respective business model. Advertisers insert advertising media in video program content either as so-called "banners" around the outside margins, or as a brief substitution for the main video program, as with a traditional TV commercial. Similar to popular Internet pages, content providers often allow the video program content to be downloaded without a specific fee since the content provider has embedded the video program content with advertising media. In such a model, the advertiser promoting the advertising media typically has a fee-for-services arrangement with the program content provider, and in effect "pays" for the "free" download by the subscriber. In this manner, a content provider makes program content available to a user for download along with the included advertising media.

SUMMARY

In a media rendering environment, subscribers employ a media player application to render media files as audio/visual playback. A media player application renders audio and video media files in a user perceptible form on a display device. Media files are typically audio or audio/video data downloaded from a remote site or locally via a CD/DVD. The media files are often distributed according to a fee for services metric to compensate the media file provider. While some media providers extract a per-download fee from subscribers, others generate revenue from advertisements embedded in the downloaded media, which is in effect, downloaded "free" by subscribers. A content feature requested by subscribers includes interspersed promotional materials (advertisements). Configurations disclosed herein are based, in part, on the observation that subscribers may attempt to circumvent the embedded ads by modifying the media files to render only the content feature, therefore frustrating the purpose of the sponsor advertisers who provide the content feature based on the expectation that the subscriber perceives the interspersed ads (ad files) as well.

Unfortunately, conventional media player applications suffer from the shortcoming that subscribers may not want to view or receive the promotional materials, and may instead modify the media files including or referencing the promotional materials to omit or substantially eliminate the advertising content by, for example, setting a zero duration of an ad file, replacing the ad file with a "null" file, or deleting the ad file entirely. It would be beneficial to develop a mechanism such that advertisers may ensure that the promotional materials are being viewed/received along with the content feature, and not bypassed or "skipped" in favor of the content feature.

Accordingly, configurations herein substantially overcome these shortcomings by defining a media program as an integrated set of media files including the requested content feature and the accompanying promotional materials. Media files associated with a particular content feature are stored as an integrated whole, and security tokens computed on selected random portions, or subsets, of the collection of media files that define the media program (content feature and interspersed ads). A set of media objects, or media files, define a media program including a content feature and interspersed ads. A hash engine operates in conjunction with a block selector to identify portion of the media files by denoting a random subset of blocks of some or all media files on the media program. The hash engine computes a security token such as a hash on the random subset of blocks. In the example herein, the hash engine, determines metadata identifying the position of each block in the file for subsequent authentication, and the security token is computed on the union of the random subsets of the media content (binary file data) and the corresponding metadata, thus computing a security token for each file (i.e. resource). Other configurations may employ other hashing granularity arrangements and hash values.

The example configuration herein deters tampering after a download of a media program during local caching/storage. The security token is computed shortly after the media is downloaded, while the media program is cached locally. During each successive playback of the locally present media, the security token is recalculated and the match values (discussed below) compared to the hash values in secure local storage.

Accordingly, the security tokens and corresponding metadata are stored in a secure repository pending a download. Upon a request for the content feature, the media player application downloads the media program, and performs the hash computation and secure storage. Prior to playback (rendering), the media player then retrieves the security tokens and metadata. The hash values are recomputed on the downloaded media program, and compared to the hashes of corresponding locations from the stored hash values and metadata. Subsequent modifications made to the downloaded files will cause a mismatch with the stored hash values and therefore indicate tampering with the media files. In this manner, storage level security is provided for both the media content files and the organization files by performing the hash check prior to playback. In an example configuration, the overall effect is a robust tamper resistant download due to an arrangement as follows: In order to ensure that the content being played is indeed what was intended by the publisher, the media player may 1) Protect the SSL/RTMPe (Secure Socket Layer/Real Time Message Protocol) based URL, using digital signature. Through SSL/RTMPe, we get transport level security, i.e. security while content is in transit, and 2) Now before the content is stored on disk, compute the hash as discussed further below, thus providing storage level security. The disclosed approach may be part of a larger authentication/protection mechanism by providing three levels of security:

Playlist/Media object descriptor signing to protect the URLs

SSL/RTMPe for transport level security

Light weight hash (or selectively hashing the file) for offline security of the media objects.

In further detail, configurations herein provide a method of preserving untampered media content by collecting a set of media objects defining a content feature, and subdividing at least one of the media objects in the set of media objects into content blocks. The media player selects a subset of the content blocks for hashing, and hashes (computes a hash value) the selected subset into metadata having a location and a hash value. The media player then stores the location and hash value in a secure repository, in which the location is indicative of a position of the content blocks in the media object and the hash value being the corresponding hash, pending a download request from a subscriber.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An example of a media player embodying the disclosed tamper resistant media storage is shown in a video media rendering environment. A video media program having the subscriber requested content feature includes embedded advertising media. The tamper resistant storage and delivery mechanism performs hashing on a selected subset of portions (subblocks) of media objects defining the integrated video media program. By selectively hashing or otherwise encrypting selected portions of the content feature and the embedded advertising media, unauthorized tampering is detectable without exhaustively encrypting (hashing) the entire integrated video media program. The media objects included in the integrated video media program are an integrated whole, and tampering with any of the included media objects is detectable by hash comparisons, such that the media player will not render the subscriber requested content feature if any of the hash values do not match.

Figure 1:
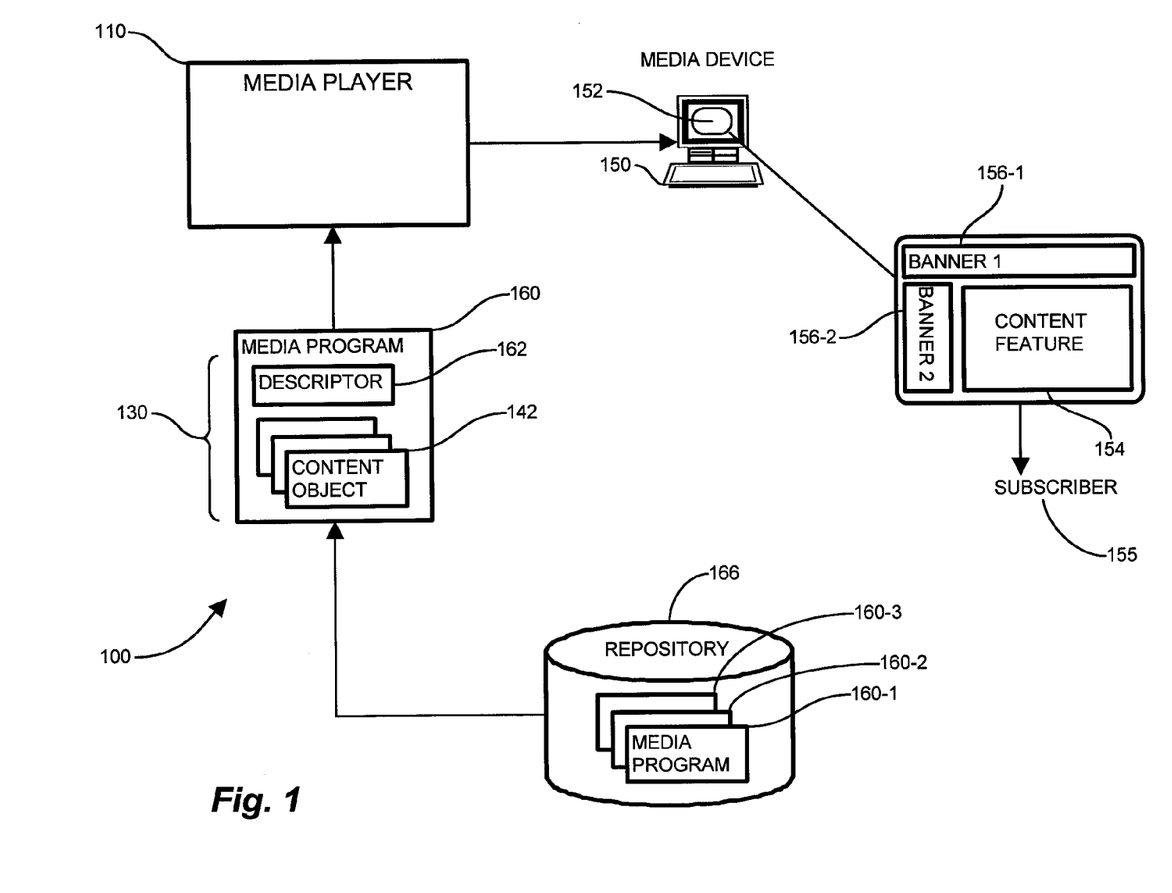
FIG. 1 is a context diagram of a media rendering environment suitable for use with the present invention.

FIG. 1 is a context diagram of a media rendering environment suitable for use with the present invention. Referring to FIG. 1, the media rendering environment 100 including a media player application 110 responsive to a media device 150 under control of a user 155 (subscriber). A media program 160 is defined by media objects 130 including a descriptor file 162 and a plurality of content objects 142 operable to present a renderable video content presentation on a display 152 of the media device 150. The media program 160 is stored in a repository 166 having a plurality of media programs 160-1 . . . 160-3 adapted for download to the media player application 110. The resulting rendered video program includes a content feature 154 with advertisements 156-1 . . . 156-2 that may be rendered as banners in the margins or as the mainstream content in place of the content feature 154. The display device 150 may be a PC, laptop, cell phone, PDA or personal rendering device such as an MP3 player or Ipod® player operable to provide the audio/video image to the user 155 (subscriber). In this manner, storage level security is provided for both the media content files and the organization files by performing the hash check prior to playback. Transport level security may be provided or combined by employing authenticating signatures on the organization files for downloading.

As is known in the art, a hash value is often implemented using a message digest, a redundant short proxy for a usually much larger message to identify if a message was modified during transmission. Message digest methods compress messages so encryption and decryption operate on less data and, therefore, take less time. Also known as cryptographic hash; cryptographic checksum; digital or message fingerprint. Note that hashes differ from encrypted content because the hash typically cannot be used to recreate the original, only to verity an unchanged state.

Figure 2:
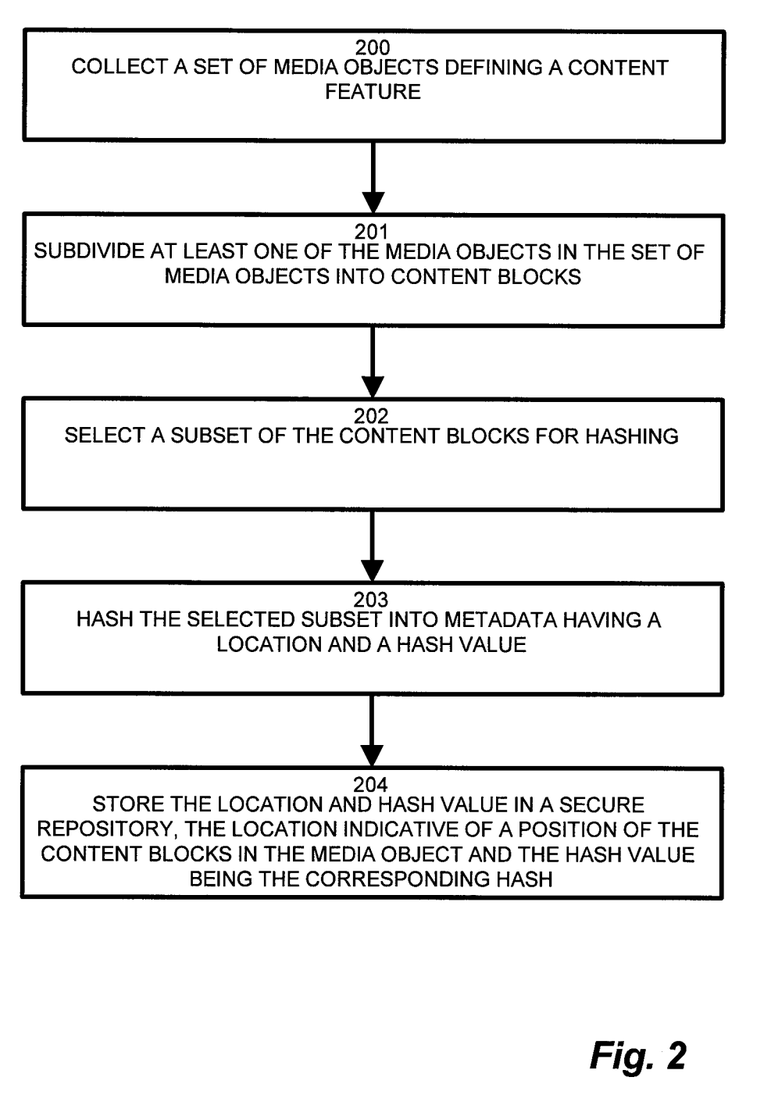
FIG. 2 is a flowchart of preserving untampered media in the environment of FIG. 1.

By way of background, message digests come in two forms: keyed and non-keyed. Non-keyed message digests are made without a secret key and are called message integrity codes (MICs) or modification detection codes (MDCs). MIC is more commonly used, but MDC seems to be a more straightforward description of how a non-keyed message digest works. Most public-key digital signatures use non-keyed message digests. Keyed message digests, known as message authentication codes (MACs), combine a message and a secret key. MACs require the sender and receiver to share a secret key. The term hash function is usually reserved for non-keyed message digests; it is sometimes used to refer to both keyed and non-keyed digest functions. Keyed does not mean that the message digest is signed (private-key encrypted). Instead, it means that the digest is made with a secret key. Keyed digests, while providing an additional layer of security, reduce performance and require the administrative key management to ensure the sender and receiver have the key. The SHA-1 digest is one of the two most popular non-keyed message digest programs. It makes a 160-bit digest. MD5 (Message Digest 5) is another popular digest FIG. 2 is a flowchart of preserving untampered media in the environment of FIG. 1. Referring to FIGS. 1 and 2, the method of preserving untampered media content as defined herein includes, at step 200, collecting a set of media objects defining a content feature, and subdividing at least one of the media objects in the set of media objects into content blocks, as depicted at step 201. The media objects are typically digital video files such as flash video (FLV) files, and include either content feature files or advertising media files. The media player collects a portion of one or more of the media objects for selective hashing by selecting a subset of the content blocks for hashing, as shown at step 202, and hashes the selected subset into metadata having a location and a hash value, depicted at step 203. The hash value and corresponding location, typically defined by a subblock identifier and interval of subblocks within the media object, allow subsequent hash value matching to detect file modification. Accordingly, the media player 110 stores the location and hash value in the secure repository 166, such that the location is indicative of a position of the content blocks in the media object 130 and the hash value being the corresponding hash, as shown at step 204.

Figure 3:
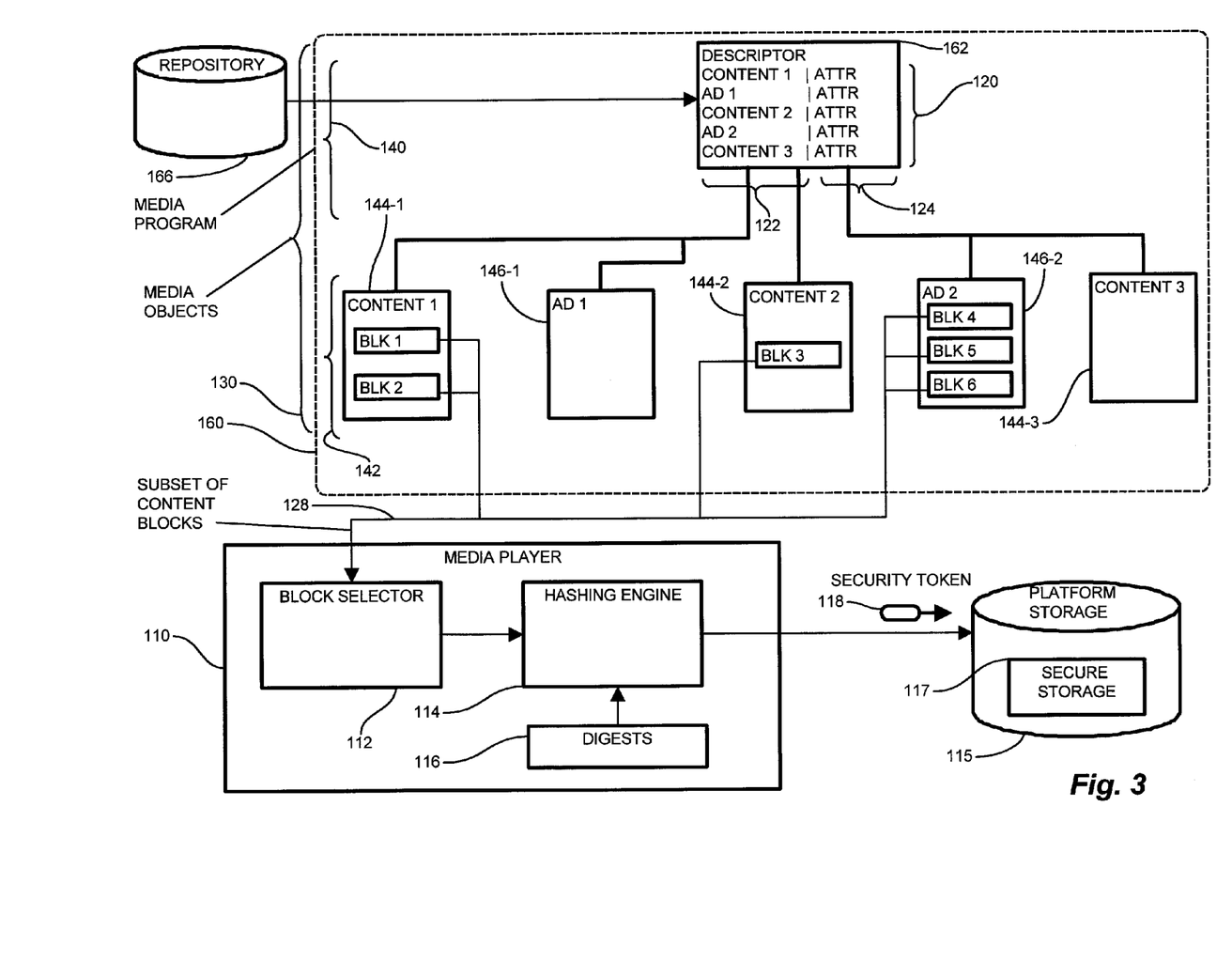
FIG. 3 is a block diagram of protecting media from tampering according to the flowchart of FIG. 2.
Figure 4:
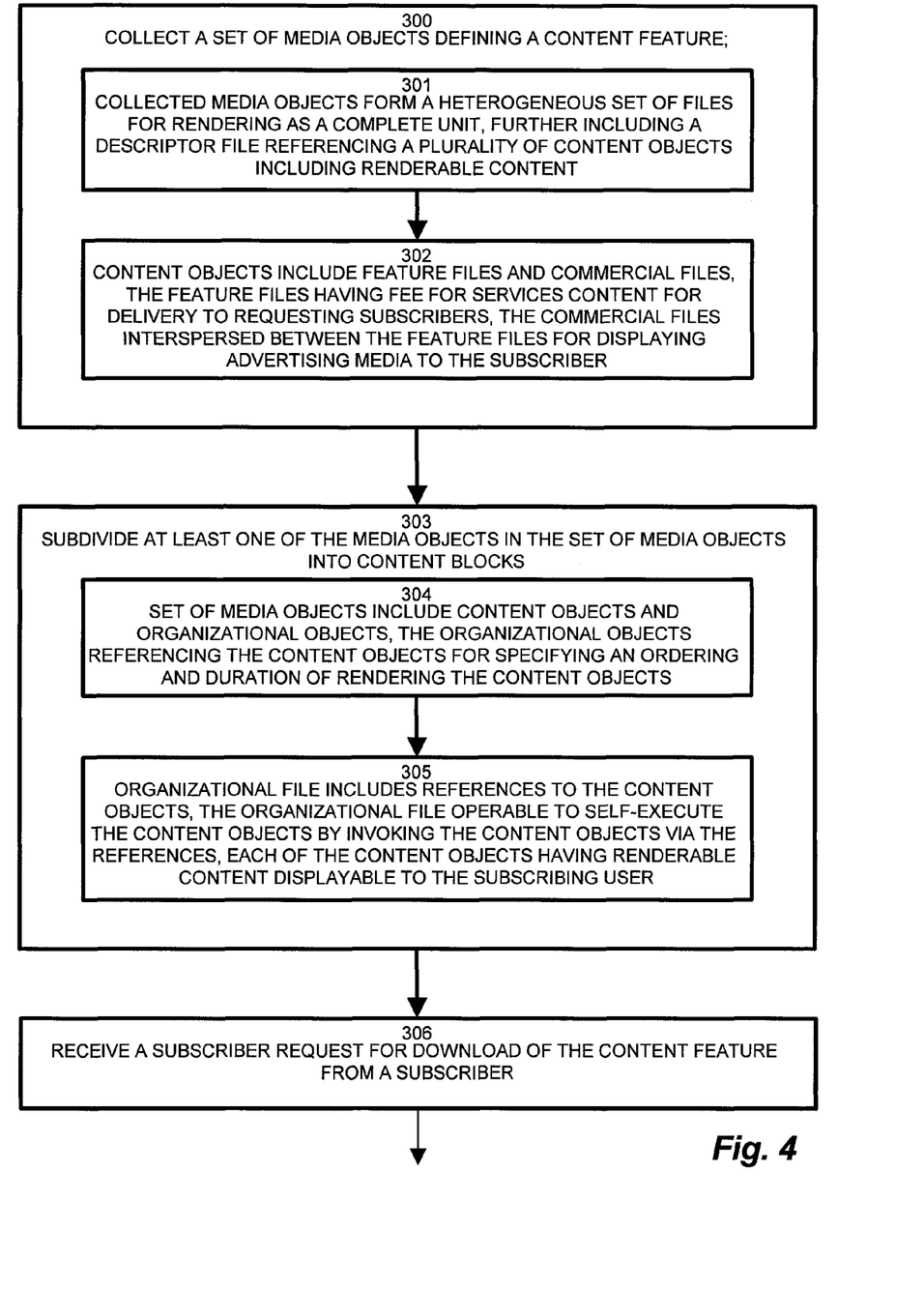
FIGS. 4-7 are a flowchart of storing media in an untamperable form according to FIG. 3.
Figure 5:
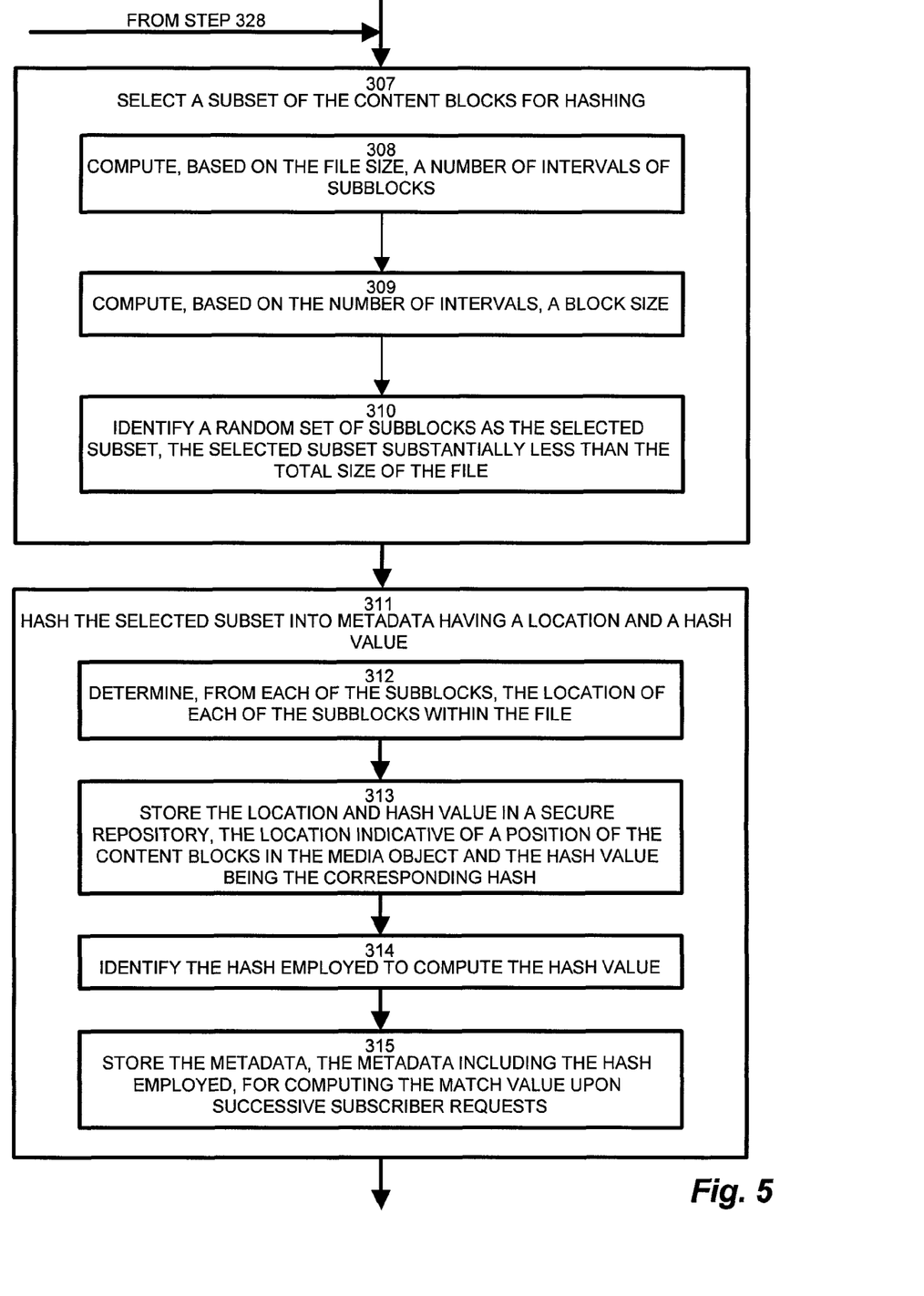
Figure 6:
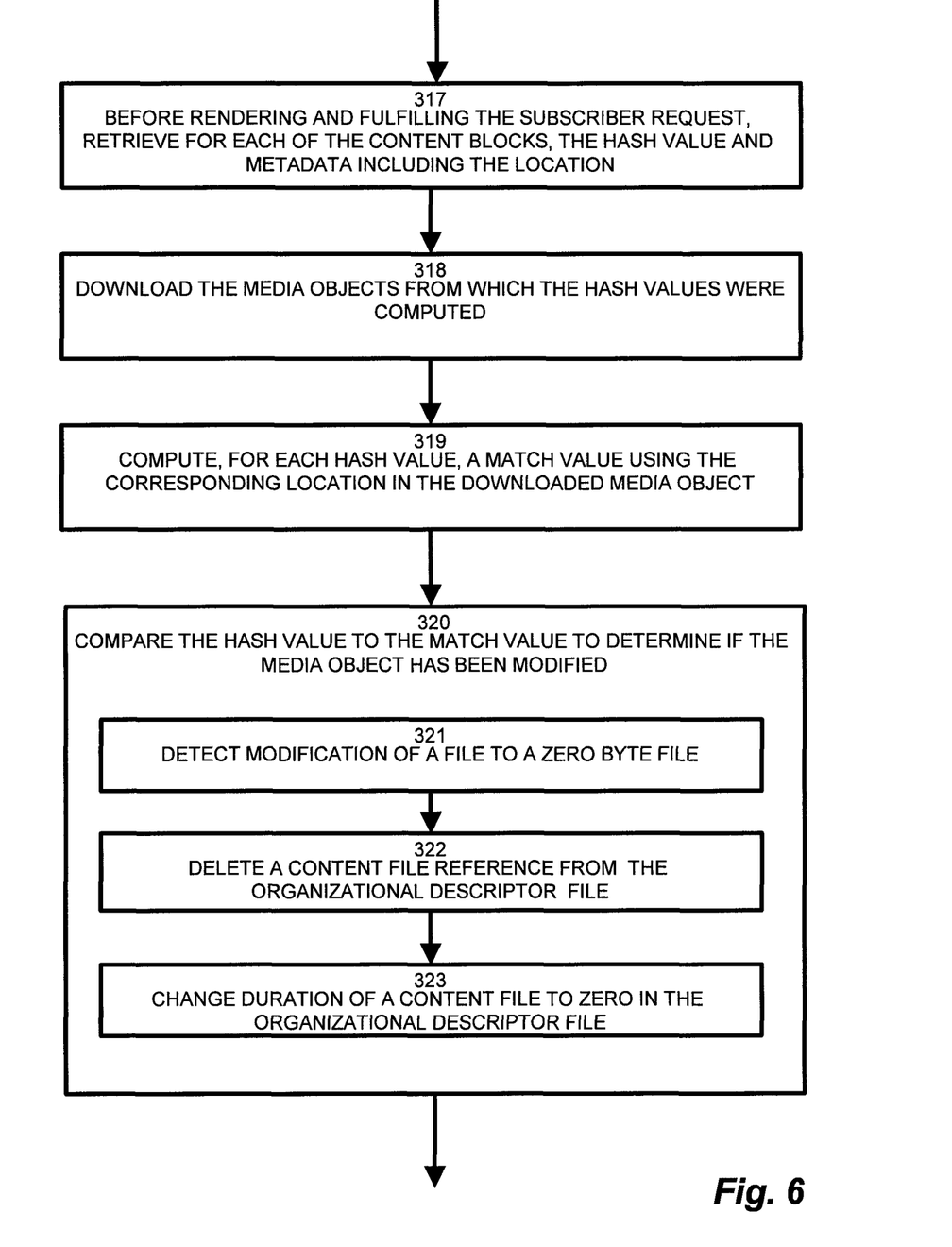
Figure 7:
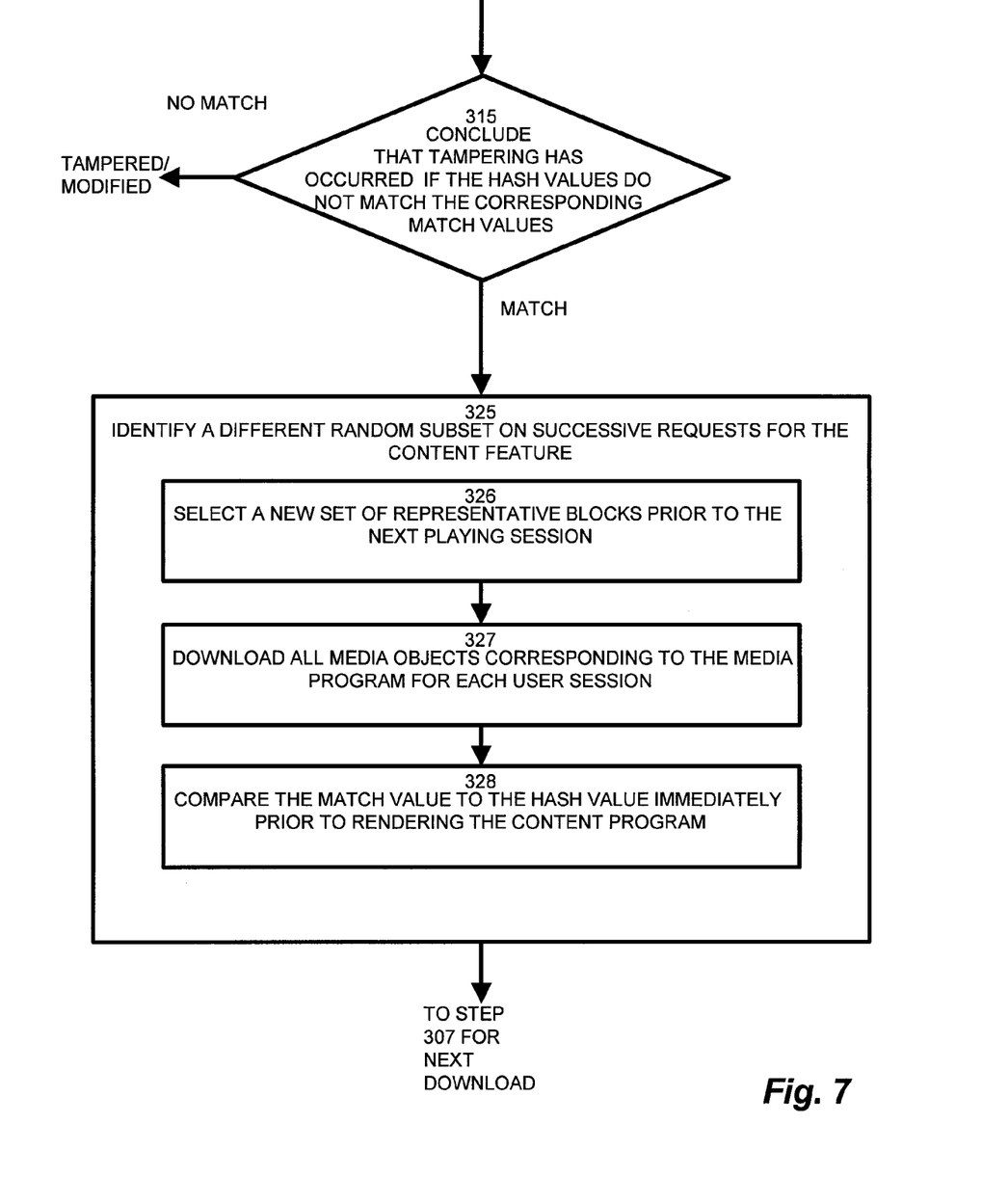

FIG. 3 is a block diagram of protecting media from tampering according to the flowchart of FIG. 2. Referring to FIGS. 2 and 3, the media program 160 is received from the repository 166. The downloaded media program 160 includes a set of interrelated media objects 130, typically files and scripts for rendering the video program and interspersed advertising content. The set of media objects 130 is intended to be rendered as a complete program including the requested video content and the interspersed advertising material. The media objects 130 in the downloaded media program 160 therefore include content objects 142, including renderable video data, and organizational objects 140 including control information regarding the ordering and duration of the video in the content objects 142. The content objects 142 further include feature files 144-1, 144-2, 144-3 (144 generally) and commercial files 146-1, 146-2 (146 generally). The feature files 144 each include portions sought media feature for which the subscriber initiated the download. The commercial files 146 include the advertising media interspersed among the media feature.

The entire media program 160 (media objects 130 including content objects 142 and organization objects 140, and thus feature files 144 and commercial files 146 among the content objects 142) has a top level organization object 140, such as a descriptor 162, including line items 120, each having a reference 122 to a media object 130 and a set of attributes 124 about the particular media object 130. The descriptor 162 is a set of instructions that executes as a script, and renders the media object 130 from the reference 122. The reference 122 may, for example, be a Uniform Resource Locator (URL), as is known in the art, or other suitable identifier for locating the media objects 130. The media object 130 is typically a content file 144 or commercial file 146, but may be another organization file 140, thus allowing nesting of the control information in the organization file 140. The attributes 124 include information such as the duration and sequential or parallel nature which the media object 130 executes. In general, the media objects 130 include organizational objects 140 such as the descriptor 162 having instructions and control information, and content objects 142 that include renderable media, such as flash video (FLV) files or other digital image data.

To protect a media program 160 from tampering, the media player 110 includes a block selector 112 that applies hash protection to the media program 160. The block selector 112 identifies some or all of the media objects 130 in the media program. From each selected media object 130, a subset of content blocks 128 is computed. The subset of content blocks 128 is based on an interval (block size) and position (order) within the media object 130, and is based on the size of the media object 130 and the number of media objects 130 in the entire media program 160. In general, the collective subset of content blocks 128 for a media program 160 provides a meaningful representation of the program 160 such that tempering would be unlikely to evade detection, yet not burden the download process with excessive hash computation. The hash value and corresponding location in the media object 130 define a security token 118 for storage in secure storage 117.

In the example shown, the selected media objects include content files CONTENT 1 (144-1) and CONTENT 2 (144-2), and the commercial file AD 2 (146-2), although organization files 140 such as the descriptor 162 may also be selected. Within each selected media object 130, the block selector 112 retrieves a random subset of content blocks BLK_1 . . . BLK_6 for the hashing engine 114. The hashing engine 114 computes a security token 118 (hash value) from available digests 116, such as the well known MD5 or SHA-1. The security token 118 also includes metadata such as the positional information (location) of the block from which the hash was computed (based on the interval and position, discussed further below) and the digest employed. A platform storage repository 115 has secure storage 117 for storing the security tokens 118 (hash values and associated metadata) in a secure, tamper-proof medium.

The set of media objects 130 may also be called a playlist, but is distinguished from, for example, audio playlists that represent homogeneous collections of divisible media entities (i.e., songs). The claimed playlist, or video entity, is a heterogeneous collection of files deliverable and operable as an integrated unit, not divisible as individual files or objects. This heterogeneous, rather than homogenous, structure distinguishes the claimed media program from conventional lists or sets of unrelated entries that contain entities that are severable and individually playable on their own outside the context of the playlist. In contrast to the disclosed system and method, conventional playlist protection is intended to prevent copying, not integrity of the collective group of files.

FIGS. 4-7 are a flowchart of storing media in an untamperable form according to FIG. 3. Referring to FIGS. 3-7, the media player 110 collects a set of media objects 130 defining a content feature 154, as depicted at step 300. The collected media objects 130 form a heterogeneous set of files for rendering as a complete unit, and further include a descriptor file 162 referencing a plurality of content objects 142 including renderable content, as disclosed at step 301. The renderable content includes both the content files defining the content feature 154 requested by the subscriber and the interspersed advertising media. Thus, the content objects 130 include feature files 144 and commercial files 146, in which the feature files 144 have fee for services content for delivery to requesting subscribers, while the commercial files 146 are interspersed between the feature files 144 for displaying advertising media to the subscriber 155, as depicted at step 302.

Prior to rendering the content feature 154, such as upon receiving a download request from the subscriber 155, the block selector 112 subdivides at least one of the media objects 130 in the set of media objects into content blocks, as shown at step 303. The set of media objects 130 include content objects 142 and organizational objects 162, such that the organizational objects 162 reference the content objects 142 for specifying an ordering and duration of rendering the content objects 142, as depicted at step 304. The example shown includes the top level descriptor file 162 as an organizational object 140, although alternate arrangements maybe employed. The organizational objects 162 include line items 120 having references 122 to the content objects 142, such that the organizational object 162 is operable to self-execute the content objects 142 by invoking the content objects 142 via the references 122, in which each of the content objects 142 has renderable content displayable to the subscribing user 155, as depicted at step 305. For example, the organization objects may be XML files including URL references to the content objects 142, and the content objects are FLV files responsive to a flash video player for rendering encapsulated video content to the subscribing user 155.

The media program 160 defines a playlist, or set of media objects 130 (heterogeneous files) that a subscriber elects to download. The media player 110 subsequently receives a subscriber 155 request for download of the media program 160 including the content feature, as depicted at step 306. Upon download and prior to rendering/playing the media program 160, the media player 110 selects a subset of the content blocks 142 for hashing, as shown at step 307. The subset of content blocks 128 may be from some or all of the media objects 130, providing a representative sampling of media objects 130 for detecting tampering or other modifications. The selection of the subset 128 further involves computing, based on the file size, a number of intervals of subblocks, as depicted at step 308. The block selector 112 then computes, based on the number of intervals, a block size, as shown at step 309. In the most basic arrangement, the file intervals define a uniform block size, generally employing a larger block size for larger files in order to maintain a manageable number of intervals. Alternate arrangements may be employed; the corresponding metadata identifies the location of each of the subblocks within the particular file.

A randomizer 176, discussed further below, identifies a random set of subblocks 128 as the selected subset, such that the selected subset is substantially less than the total size of the file, as shown at step 310. As indicated above, selection of a random subset, rather then the entire file, provides tampering detection without substantially impacting performance from exhaustive hashing or other security token generation. The hashing engine 114 then hashes the selected subset 128 into a security token 118 including metadata indicative of a location and a hash value, as depicted at step 311. The example configuration performs a hash over each of the subblocks from a particular media object 130, along with the metadata indicative of the location, thus generating a security token 118 for each media object 130 for which the block selector 112 selected a set of subblocks. Alternate hashing arrangements and sets of subblocks may be apparent. This includes determining, from each of the subblocks, the location of each of the subblocks within the file (media object 130), as disclosed at step 312. The location may be a simple multiple of the interval, as discussed above, or another suitable mechanism for identifying the portion of the file over which the hash is computed. Further, the hash may be computed as a single value over the set of subblocks from the media object 130, as individual values for each block, or any other suitable combination, and may or may not include the metadata and location information. The media player 110 stores the location and hash value in a secure repository 118, such that the location is indicative of a position of the content blocks in the media object 130 and the hash value being the corresponding hash, as depicted at step 313. The media player 110 further identifies the hash employed to compute the hash value, as disclosed at step 314, and stores the metadata, in which the metadata includes the hash employed, for computing the match value upon successive subscriber requests, as depicted at step 315. As is known in the art, a successive hash computed over the same data using the same hash produces the same hash value if the data has not been modified.

Following downloading and hashing in steps 306-315, the media program 160 and associated security tokens 118 are stored in the secure storage 117 repository. Using the metadata from the corresponding security tokens 118, the media player 110 identifies the random subset of content blocks 128 within the media objects 130. The media player 110 retrieves, for each of the content blocks 128, the hash value and metadata including the location, as disclosed at step 317. Before fulfilling and rendering the media program 160, the media player 110 downloads or retrieves the media objects 130 from which the hash values were computed, as shown at step 318; recall that the hash values and metadata are stored in the secure repository 117, while the media objects 130 defining the media program need not consume such storage and are stored in the repository 166. The hashing engine 114 computes, for each hash value, a match value using the corresponding location in the downloaded media object, as shown at step 319. The match value computation identifies the corresponding selected subset of subblocks within the media object 130 using the retrieved location values. The media player 110 compares the hash value to the match value to determine if the media object 130 has been modified, as depicted at step 320. The hash comparison is operable to detect modification of a file to a zero byte file, as shown at step 321, deletion of a content file reference 122 from an organizational object 140, as disclosed at step 322, and changing duration of a content file (such as a commercial file 146) to zero in the organizational object file such as the descriptor file 162, as depicted at step 323, although this list is by no means exhaustive.

The match comparison thus concludes that tampering has occurred if the hash values do not match the corresponding match values, as depicted at step 324. If no tampering is detected, the block selector 112 identifies a different random subset of content blocks 128 on successive requests for the content feature, to prevent identification and "hacking" of the hashing mechanism, as shown at step 325. Thus, the block selector 112 selects a new set of representative blocks prior to the next playing session, as depicted at step 326, and downloads and/or rehash all media objects corresponding to the media program 160 for each user session, as disclosed at step 327. Repeating the downloading ensures the integrity of recomputing the hash on a different set of subblocks 128 for each rendering request. Each subsequent download results in the media player 110 comparing the match value to the hash value immediately prior to rendering the content program, as depicted at step 328.

Figure 8:
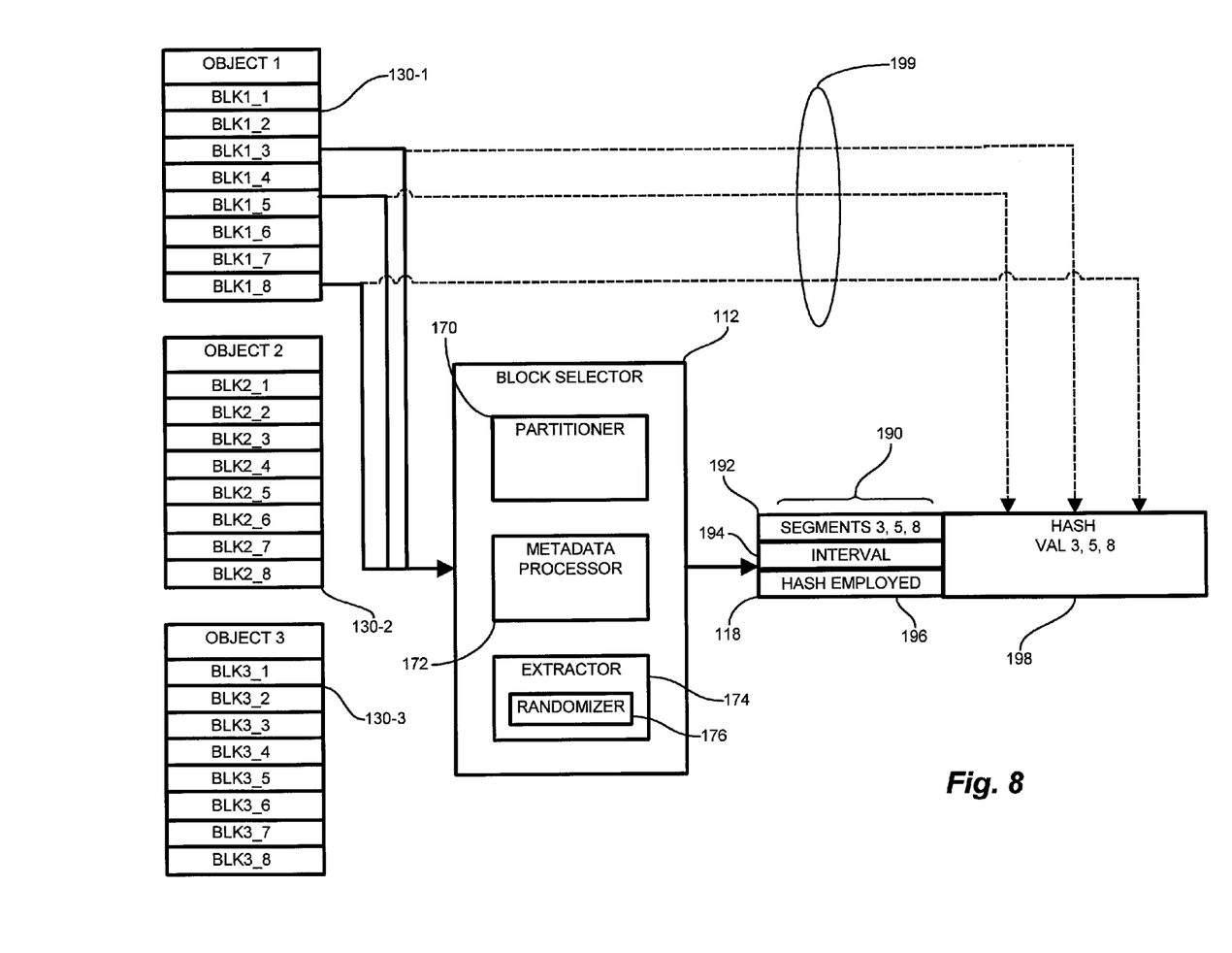
FIG. 8 is an example diagram of security tokens employed to prevent media tampering as in the flowchart of FIGS. 4-7

FIG. 8 is an example diagram of security tokens and related structure employed to prevent media tampering as in the flowchart of FIGS. 4-7. The illustrated embodiment is exemplary; alternate security token generation, such as varying arrangements of identifying the subset of blocks from which to compute the hash, metadata storage, and the hash employed may be employed without deviating from the scope of the invention. Referring to FIGS. 3-8, example media objects 130-1, 130-2 and 130-3 are shown, each including a subset of blocks BLK1-1 . . . BLK1-8, BLK2-1 . . . BLK2-8 and BLK3-1 . . . BLK3-8, respectively. Note that media objects 130-1 . . . 130-3 may be any of either organizational objects 140, feature files 144, or commercial files 146. The block selector 112 includes a partitioner 170, a metadata processor 172, and an extractor 174 having a randomizer 176. The partitioner 170 computes an interval and sequence for denting subblocks BLK1_n within the media object 130. The extractor 174 uses the randomizer 176 to select a random subset of the partitioned subblocks BLK1_n, and extracts the subblocks for hashing by the hash engine 114.

The security token 118 stores the metadata 190 including the identity of the selected subset of blocks 192 for hashing, the interval 194 from which the blocks were partitioned, and the hash function 196 employed. The security token 118 also stores the corresponding hash value once computed by the hashing engine 114. In the example shown in FIG. 8, the extractor 124 selects blocks 3, 5 and 8 from media object 1 130-1 (BLK1_3, BLK1_5 and BLK1_8, respectively), and stores the computed hash as hash value 198, shown by arrows 199. The identity of the selected blocks is thus stored in the metadata segments 192. Alternate arrangements of the block identity and computed hash will be apparent to those of skill in the art.

Those skilled in the art should readily appreciate that the programs and methods for representing and processing video information as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using an electronic network such as the Internet or telephone modem lines. The disclosed method may be in the form of an encoded set of processor based instructions for performing the operations and methods discussed above. Such delivery may be in the form of a computer program product having a computer readable medium operable to store computer program logic embodied in computer program code encoded thereon, for example. The operations and methods may be implemented in a software executable object as a set of instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for representing and processing video information has been particularly shown and described with references to embodiments thereof, it will be understood by those skilled in the art that various changes in form and details may be made therein without departing from the scope of the invention encompassed by the appended claims.

What is claimed is:

1. A method comprising:
    collecting a set of media objects defining a content feature;
    subdividing at least one of the media objects in the set of media objects into content blocks;
    selecting a subset of the content blocks for hashing, wherein selecting the subset includes:
        identifying a random subset of content blocks within the media object, and
        identifying a different random subset on successive requests for the content feature;
    generating a hash value for the selected subset by hashing the selected subset;
    storing a location and hash value in a secure repository, the location indicative of a position of the subset in the media object; and
    receiving a subscriber request for download of the content feature from a subscriber.

2. The method of claim 1 wherein the collected media objects form a heterogeneous set of files for rendering as a complete unit, further including a descriptor file referencing a plurality of content objects including renderable content.

3. The method of claim 2 wherein the content objects include feature files and commercial files, the feature files having fee for services content for delivery to requesting subscribers, the commercial files interspersed between the feature files for displaying advertising media to the subscriber.

4. The method of claim 2 wherein selecting a subset further comprises:
    computing, based on the file size, a number of intervals of subblocks;
    computing, based on the number of intervals, a block size;
    identifying a random set of subblocks as the selected subset, the selected subset substantially less than the total size of the file; and
    determining, from each of the subblocks, the location of each of the subblocks within the file.

5. The method of claim 1 wherein the set of media objects include content objects and organizational objects, the organizational objects referencing the content objects for specifying an ordering and duration of rendering the content objects.

6. The method of claim 5 further comprising upon receiving the subscriber request:
    retrieving, for each of the content blocks in the subset of content blocks, the hash value and metadata including the location;
    downloading the media objects from which the hash values were computed;
    computing, for each hash value, a match value using the corresponding location in the downloaded media object;
    comparing the hash value to the match value to determine if the media object has been modified; and
    concluding that tampering has occurred if the hash values do not match the corresponding match values.

7. The method of claim 6 further comprising:
    identifying the hash employed to compute the hash value; and
    storing the metadata, the metadata including the hash employed, for computing the match value upon successive subscriber requests.

8. The method of claim 7 wherein the hash comparison is operable to detect at least one of:
    modification of a file to a zero byte file;
    deletion of a content file reference from an organizational object; and
    changing duration of a content file to zero in the organizational object file.

9. The method of claim 6 further comprising:
    selecting a new set of representative blocks prior to the next playing session;
    downloading all media objects corresponding to the media program for each user session; and
    comparing the match value to the hash value immediately prior to rendering the content program.

10. The method of claim 6 wherein the organizational objects include references to the content objects, the organizational object operable to self-execute the content objects by invoking the content objects via the references, each of the content objects having renderable content displayable to the subscribing user.

11. The method of claim 10 wherein the organization objects are XML files including URL references to the content object, the content objects being FLV files responsive to a flash video player for rendering encapsulated video content to the subscribing user.

12. A media player device comprising:
   a block selector operable to collect a set of media objects defining a content feature;
   a partitioner in the block selector operable to subdivide at least one of the media objects in the set of media objects into content blocks;
   an extractor in the block selector operable to select a subset of the content blocks for hashing;
   a hash engine operable to hash the selected subset to generate a hash value; and
   a secure storage repository operable to store a location of the selected subset and the hash value in a secure repository, the location indicative of a position of the selected subset in the media object.

13. The media player of claim 12 further comprising a user interface operable to receive a subscriber request for download of the content feature from a subscriber, wherein the block selector is further operable to:
   identify a random subset of content blocks within the media object; and
   identify a different random subset on successive requests for the content feature.

14. The media player of claim 13 wherein the collected media objects form a heterogeneous set of files for rendering as a complete unit, further including a descriptor file referencing a plurality of content objects including renderable content, and the content objects include feature files and commercial files, the feature files having fee for services content for delivery to requesting subscribers, the commercial files interspersed between the feature files for displaying advertising media to the subscriber.

15. The media player of claim 12 wherein the block selector is further operable to:
   compute, based on the file size, a number of intervals of subblocks;
   compute, based on the number of intervals, a block size;
   identify a random set of subblocks as the selected subset, the selected subset substantially less than the total size of the file; and
   determine, from each of the subblocks, the location of each of the subblocks within the file, further comprising a metadata processor operable to:
      identify the hash employed to compute the hash value; and
      store the metadata, the metadata including the hash employed, for computing the match value upon successive subscriber requests,
      select a new set of representative blocks prior to the next playing session;
      download all media objects corresponding to the media program for each user session; and
      compare the match value to the hash value immediately prior to rendering the media program.

16. The media player of claim 13 wherein the set of media objects include content objects and organizational objects, the organizational objects referencing the content objects for specifying an ordering and duration of rendering the content objects, the media player further operable to, upon receiving the subscriber request:
   retrieve, for each of the content blocks in the subset of content blocks, the hash value and metadata including the location;
   download the media objects from which the hash values were computed;
   compute, for each hash value, a match value using the corresponding location in the downloaded media object;
   compare the hash value to the match value to determine if the media object has been modified; and
   conclude that tampering has occurred if the hash values do not match the corresponding match values.

17. A computer program product having a non-transitory computer readable storage medium operable to store computer program logic embodied in computer program code encoded thereon as an encoded set of processor based instructions for performing a method comprising:
   computer program code for collecting a set of media objects defining a content feature;
   computer program code for subdividing at least one of the media objects in the set of media objects into content blocks;
   computer program code for selecting a subset of the content blocks for security token computation;
   computer program code for computing, for each selected content block, a security token having a location of a corresponding selected content block and a security value; and
   computer program code for storing the location and security value in a secure repository, the location indicative of a position of the content blocks in the media object.

18. The computer program product of claim 17 wherein the computer program code for computing the security token further comprises computer program code for hashing the selected subset into metadata having a location and a hash value.

19. The computer program product of claim 18 wherein the computer program code for hashing further comprises computer program code for employing a secret key to generate a keyed hash.

* * * * *